United States Patent
Domzalski et al.

[11] Patent Number: 6,135,713
[45] Date of Patent: Oct. 24, 2000

[54] HELICOPTER ROTOR BLADE FLAP ACTUATOR GOVERNMENT INTEREST

[75] Inventors: David B. Domzalski, Gilbert; Friedrich K. Straub; Dennis K. Kennedy, both of Mesa, all of Ariz.

[73] Assignee: The McDonnell Douglas Helicopter Company, Mesa, Ariz.

[21] Appl. No.: 09/233,986

[22] Filed: Jan. 19, 1999

[51] Int. Cl.$^7$ ...................................................... B64C 9/00
[52] U.S. Cl. .......................... 416/23; 416/104; 416/108; 416/155
[58] Field of Search ................................ 415/119; 416/23, 416/24, 31, 104, 105, 108, 155, 214 R, 99; 310/328, 26

[56] References Cited

U.S. PATENT DOCUMENTS

| | | |
|---|---|---|
| 2,961,051 | 11/1960 | Wilford . |
| 4,793,571 | 12/1988 | Kranz . |
| 4,812,698 | 3/1989 | Chida et al. . |
| 4,845,357 | 7/1989 | Brennan . |
| 5,150,864 | 9/1992 | Roglin et al. ............................ 244/219 |
| 5,224,826 | 7/1993 | Hall et al. .................................. 416/4 |
| 5,626,312 | 5/1997 | Head . |
| 5,907,211 | 5/1999 | Hall et al. ................................ 310/328 |
| 5,973,440 | 10/1999 | Nitzsche et al. ......................... 310/326 |

FOREIGN PATENT DOCUMENTS 822602  7/1997  European Pat. Off. .

OTHER PUBLICATIONS

Straub, et al., "Application of Smart Materials to Helicopter Rotor Active Control," presented at SPIE's Symposium on Smart Structures and Materials, San Diego, Mar. 3–6, 1997.

Straub, et al., "Application of Smart Materials to Control of a Helicopter Rotor," presented at SPIE'Symposium on Smart Structures and Materials, San Diego, Feb. 26–29, 1996.

*Primary Examiner*—Edward K. Look
*Assistant Examiner*—Ninh Nguyen
*Attorney, Agent, or Firm*—Bryan Cave LLP

[57] ABSTRACT

An actively controlled helicopter rotor blade includes a trailing edge flap actuated by a fast-acting actuator. A lightweight, rugged, fast-acting actuator suitable for use as the flap actuator comprises a pair of column actuators composed of a smart material such as piezoelectric, magnetostrictive, shape memory alloy or other material that exhibits a shape change when subjected to an external stimulus. Each of the column actuators is composed of multiple piezoelectric ceramic actuator elements bonded together to form the individual columns. Each of the column actuators engages the base of an actuator tube that, in turn, is urged against the column actuators by a tension member. Differential voltage applied to the columns causes a differential elongation of the column actuators, which causes the actuator tube to pivot about an axis proximal the tips of the column actuators. The movement of the actuator tube is coupled by a linkage to the rotor blade flap. Spherical joints are disposed between the column actuators and the actuator tube to prevent transmission of substantial bending loads to the column actuators and a mid-point support is also provided for each of the column actuators to limit the magnitude of acceleration induced bending loads, which would otherwise lead to tensile failure of the ceramic actuator elements.

14 Claims, 3 Drawing Sheets

HELICOPTER ROTOR BLADE FLAP ACTUATOR GOVERNMENT INTEREST

GOVERNMENT INTEREST

This invention was made with the support of the United States government under contract number DAAH04-95-C-0006 awarded by the United States Air Force. The government has certain rights to this invention.

BACKGROUND OF THE INVENTION

Helicopters are unique in their ability to operate in vertical, hover and translational modes of flight. The price exacted by this multiple flight mode capability, however, is that limits are imposed on the design options available for each flight regime, which results in less than optimum efficiency for each. The main rotor must operate in a highly complex and unsteady aerodynamic environment with tight coupling of the rotor/airframe aerodynamics, dynamics, and structural characteristics. The complex aerodynamic environment leads to high noise, especially during landing when blade vortex interactions cause elevated acoustic energy to be transmitted from the aircraft. The tight coupling of the main rotor to the airframe causes high levels of vibration to be transmitted to the airframe, which adversely affects passenger comfort and pilot endurance; and the differential airspeed experienced by the advancing and retreating blades during translational flight limits the top speed of a helicopter.

In a conventional helicopter control system, the longitudinal and lateral rotor blade cyclic pitch control as well as the average rotor blade pitch (collective) are transmitted the rotor blades by means of a rotor blade swashplate mechanism. Pilot control inputs are translated into elevation and tilt angle of the non rotating swashplate which are transmitted to the rotor blades by means of pitch links attached at their lower ends to a rotating swashplate and at their upper ends to the leading or trailing edges of the blades near their attachment to the main rotor hub. Conventional helicopter control systems, thus, are unable to provide any control inputs other than collective and once-per-revolution cyclic pitch adjustments of the rotor blades. It has been suggested that the aerodynamic forces that contribute to the noise, vibration and speed limitations inherent in helicopter flight could be compensated or negated if it were possible to provide aerodynamic control inputs that were decoupled from the cyclic pitch controls and thus could be provided at arbitrary frequencies. Independent control of these aerodynamic forces could, of course, be achieved through the use of active control surfaces on the rotor blades themselves, however, because the active control surfaces and their servo mechanisms would have to be housed within the main rotor blades, numerous design limitations have heretofore prevented practical implementation of such rotor blade control surfaces. Among the most challenging of the design constraints is that additional weight of any such control surface and its servomechanism must be small. Otherwise the total weight of the rotor blade, which must be supported by the main hub, becomes unacceptably high. Additionally, the actuator must be capable of withstanding the high centrifugal forces and flapping accelerations experienced by the rotor blades. Accordingly, what is needed to implement the aforementioned dynamic active helicopter blade control is a helicopter rotor blade equipped with a control surface, such as a trailing edge flap, coupled to a lightweight, rugged actuator suitable for mounting within the profile of a helicopter rotor blade.

SUMMARY OF THE INVENTION

According to the present invention, a helicopter rotor blade flap comprises a trailing edge flap actuated by a fast-acting actuator. A lightweight, rugged, fast-acting actuator suitable for use as the flap actuator comprises a pair of column actuators composed of a smart material such as piezoelectric, magnetostrictive, shape memory alloy or other material that exhibits a shape change when subjected to an external stimulus. An intermediate support such as a support disposed at the mid-point of each column supports the column actuators against bending loads.

In a preferred embodiment, each of the column actuators is composed of multiple piezoelectric ceramic actuator elements bonded together to form the individual columns. Each of the column actuators engages the base of an actuator tube that, in turn, is urged against the column actuators by a tension member. Differential voltage applied to the columns causes a differential elongation of the column actuators, which causes the actuator tube to pivot about an axis proximal the tips of the column actuators. The movement of the actuator tube is coupled by a linkage to the rotor blade flap. Spherical joints are disposed between the column actuators and the actuator tube. The spherical joints prevent transmission of substantial bending loads to the column actuators, which would otherwise lead to tensile failure of the ceramic actuator elements.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
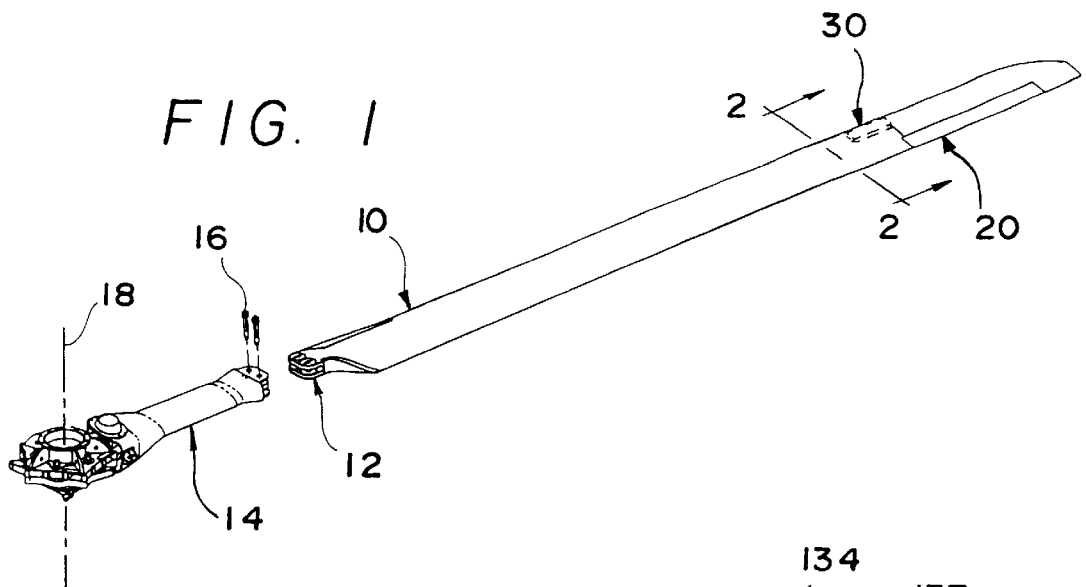
FIG. 1 is a perspective view of a helicopter rotor blade incorporating features of the present invention.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 is a perspective view of a helicopter rotor blade 10 incorporating features of the present invention. Blade 10 comprises an inner mounting flange 12 which is coupled to helicopter main rotor hub 14 by conventional fasteners 16. Blade 10 rotates about azimuthal axis 18 and receives cyclic and collective pitch commands via conventional pitch links (not shown) in a manner that is well known in the art. Blade 10 further includes a trailing edge flap 20 that may be rotated up or down to alter the lift of blade 10 thereby suppressing the undesirable aerodynamic forces that contribute to blade noise and aircraft vibration and/or compensating for loss of lift of a retreating blade during translational flight. Flap 20 preferably extends from about 78 to 96 percent of the swing radius of blade 10 and is operated by a fast acting rotor flap actuator 30 discussed more fully hereinafter.

Figure 2B:
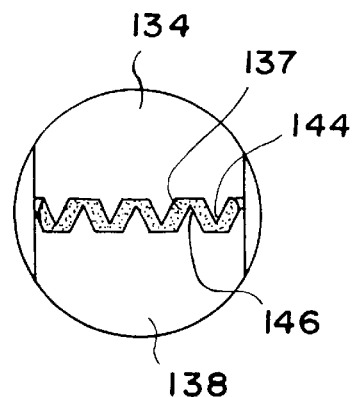
FIG. 2B is an enlarged view of a portion of FIG. 2A.
Figure 2A:
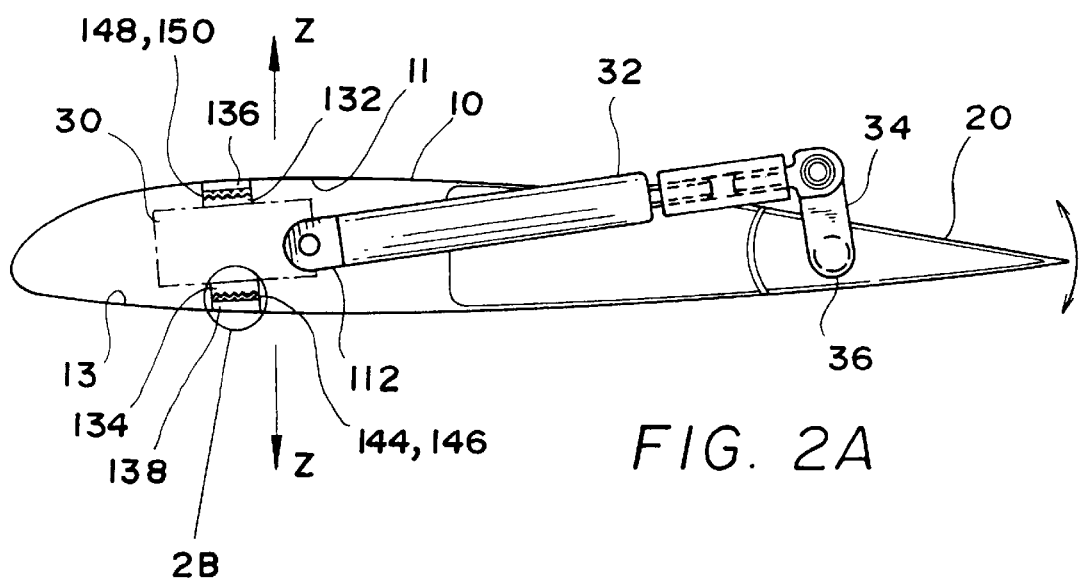
FIG. 2A is a cross sectional view of the rotor blade of FIG. 1.

FIG. 2A is a cross sectional view of rotor blade 10 taken along line 2—2 of FIG. 1. Rotor flap actuator 30 (shown in phantom lines) actuates rotor flap 20 by extending and retracting actuator arm 32 which, in turn, causes bell crank 34 to rotate rotor flap 20 about flap hinge 36. As is evident from FIG. 2A, rotor flap actuator 30 must be of compact construction to fit within the profile defined by rotor blade 10. At the same time, it must be powerful enough to actuate the rotor flap and sufficiently rugged to withstand the centrifugal forces attributable to the spinning rotor blade as well as the blade flapping accelerations (ie. in the direction indicated as Z in FIG. 2A). The inventors of the present invention have determined that actuator incorporating a smart material such as a magnetostrictive (MS) material, a shape memory alloy (SMA), an electrostrictive (ES), or preferably a piezoelectric (PE) material satisfy the requirements of a lightweight, rugged actuator. Electromagnetic, thermal, and electric stimulation, respectively, induce a predictable shape change in these materials. This shape change can be harnessed through an appropriate linkage to perform work, such as the actuation of a blade flap. MS and PE materials have relatively low strain magnitudes but have high frequency responses. SMA materials have high induced strain magnitudes, but a very low frequency response. Accordingly, for the positioning of rapidly changing control surfaces such as a rotor blade trailing edge flap, MS and PE materials are the most suitable. Because of the relatively small strain magnitudes, however, MS and PE materials must be used in conjunction with stroke amplification linkages and/or be configured in stacks to provide suitably large output strokes.

Figure 3:
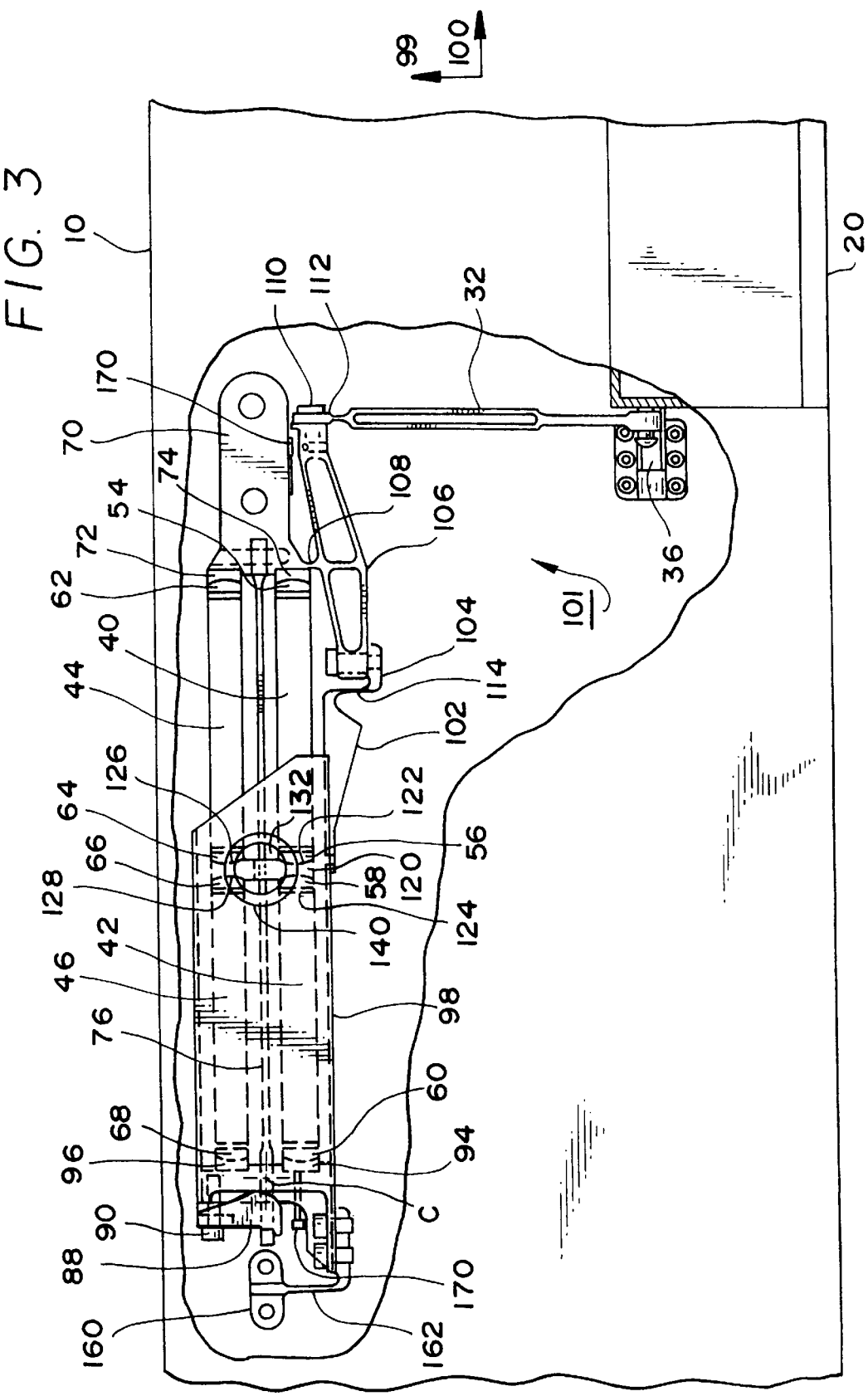
FIG. 3 is a plan view of the rotor blade of FIG. 1 with a portion cut away to reveal an illustrative embodiment of a rotor blade actuator incorporating features of the present invention.
Figure 4:
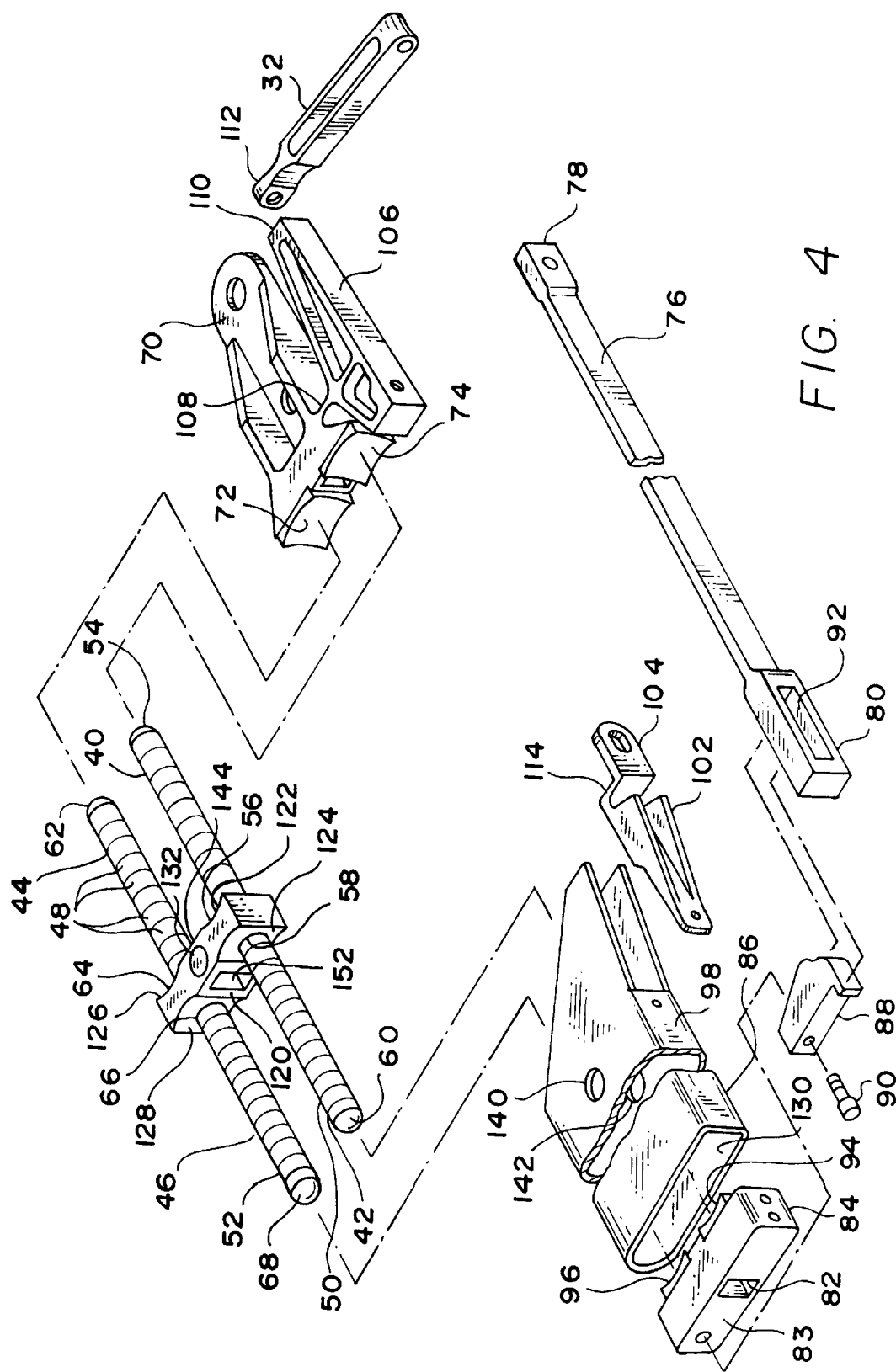
FIG. 4 is an exploded perspective view of the major components of the rotor blade actuator of FIG. 3.

FIG. 3 is a partial plan view of rotor blade 10 with a portion cut away to reveal an illustrative embodiment of a rotor flap actuator in accordance with the principles of the present invention. FIG. 4 is an exploded perspective view of the major components of the rotor flap actuator of FIG. 3. With reference to FIGS. 3 and 4 rotor flap actuator 30 comprises four stacks 40, 42, 44, and 46 comprised of 5 individual piezoelectric elements 48 bonded together to form each stack. The piezoelectric elements used in the illustrative embodiment are commercially available piezoceramic actuator elements manufactured by Polytec PI, part no P-915K046.

Stacks 40 and 42 and stacks 44 and 46 are arranged into two parallel columns 50 and 52, respectively. Each of stacks 40, 42, 44 and 46 includes a convex semi-spherical steel end cap 54, 56, 58, 60, 62, 64, 66, and 68. A mounting flange 70 is attached by conventional fasteners to the rotor blade 10. Mounting flange 70 includes a pair of concave semi-spherical seats 72 and 74, which have a spherical diameter that is complementary to the spherical diameter of end caps 54 and 62. A tension strap 76 is attached at its outer end 78 to mounting flange 70 between seats 72 and 74. Columns 50 and 52 are mounted to mounting flange 70 by disposing end caps 54 and 62 against seats 72 and 74 of mounting flange 70. An actuator tube 86, comprising a tube of substantially rectangular cross section, is placed over the columns 50 and 52 such that end caps 60 and 68 engage a pair of semi-spherical seats 94 and 96 formed in base 84 of actuator tube 86. The inner end 80 of tension strap 76 is passed through an opening 82 in the base 84 of actuator tube 86. A cam 88 passes then through an aperture 92 in inner end 80 of tension strap 76. Cam 88 engages the surface 83 of base 84 and is operated by a threaded fastener 90 which causes cam 88 to place tension strap 76 in tension while placing columns 50 and 52 in compression. An offset adjustment such as adjustment screw 170, which engages the back surface of seat 94, may be provided to adjust the final position of actuator tube 86.

Thus configured, the trailing wall 98 of actuator tube 86 is substantially parallel to columns 50 and 52 and to the span direction 100 of rotor blade 10. When a reference voltage is applied to the individual elements 48 of columns 50 and 52, columns 50 and 52 elongate, which increases the tension in tension strap 76, and the compressive forces in each of columns 50 and 52, but does not result in a substantial change in the parallel relationship between trailing wall 98 and span direction 100. If, however, a differential voltage is applied to the elements 48 of column 50 versus the elements 48 of column 52, the differential elongation of columns 50 and 52 will cause actuator tube 98 to rotate about a virtual axis "C" thereby amplifying the differential elongation of columns 50 and 52.

Movement of actuator tube 98 is converted into flap position by means of a linkage 101, which provides additional stroke amplification. Linkage 101 comprises a tip extension 102, which is attached to trailing wall 98 and which extends beyond actuator tube 98. The outer end 104 of tip extension 102 is attached to a rocker arm 106, which pivots in response to movement of tip extension 102 about a hinge comprising a thinned section 108. The outer end 110 of rocker arm 106, in turn, is pivotally attached to the leading end 112 of actuator arm 32, which actuates flap 20 as hereinbefore described. Tip extension 102 includes a thinned section 114, which allows outer end 104 to transmit forces in the lead/lag direction 99 without transmitting substantial forces in the span direction 100. A position sensor, such as a hall-effect sensor 170 may be mounted to mounting flange 70 to permit direct feedback of the position of rotor flap 20.

As is well known in the art, piezoelectric ceramic materials have substantial compressive strength but fail easily in tension. The low tensile strength of piezoelectric ceramics leads to frequent tensile failures when a multiple-element stack is subjected to bending loads. This limits the total stack height of a piezoceramic actuator column to relatively modest aspect ratios and therefore limits the maximum stroke available from such a column actuator. The inventors of the present invention discovered, however, that the stroke of a high aspect ratio multiple-element actuator could be replicated by arranging multiple shorter stack column actuator elements end-to end with provisions to support the stacks against side loads and with provisions to minimize bending loads transmitted by the support structure. It is also well known in the art that piezoelectric materials have a high thermal coefficient of expansion. Use of the differential elongation of two columns of piezoelectric materials 50 and 52 to generate an actuator output, as in the illustrative example, automatically cancels out any thermal effects and ensures that if actuator power is lost, the actuator will return to a neutral position. The parallel stack configuration also permits the preload of columns 50 and 52 to be adjusted (using cam 88) without affecting the position of rotor flap 20.

With reference to FIGS. 3 and 4, the illustrative embodiment includes a central support structure 120 adapted to support stacks 40, 42, 44 and 46 at approximately the mid-point of columns 50 and 52. Central support structure 120 comprises concave semi-spherical seats 122, 124, 126 and 128, which are adapted to engage semi-spherical end caps 56, 58, 64 and 66, respectively. The spherical junctions at the central support structure 120 (as well as the spherical junctions at mounting flange 70 and base 84) transmit compressive loads along the axes of stacks 40, 42, 44, and 46 but do not transmit substantial bending loads, which could lead to tensile failure of stacks 40, 42, 44 and 46.

Preferably, a low friction bearing material such as Garlock DU is applied to the seats 72, 74, 94, 96, 122, 124, 126, 128 of the spherical joints to further reduce the transfer of bending loads to the stacks 40, 42, 44 and 46. With particular reference to FIGS. 2A, 2B and 4, central support structure 120 further includes a pair of spacers 132 and 134 that engage a corresponding pair of spacers 136 and 138 attached to the inner walls 11 and 13 of rotor blade 10 Actuator tube 86 has a pair of apertures 140 and 142 that permit spacers 132 and 134 to engage their corresponding spacers 136 and 138. Apertures 140 and 142 are sized so as to permit movement of actuator tube 86 without causing interference between apertures 140 and 142 and their corresponding spacers 132 and 134. Spacers 132 and 134 are closely fitting with their corresponding spacers 136 and 138, particularly in the flapping direction (i.e. out of the plane of FIG. 3), and are adhesively bonded together by an elastomeric material such as RTV silicone rubber 137 so as to provide maximum support and damping to columns 50 and 52 against acceleration in the flapping direction. Additional support in the lead/lag direction 99 is provided by a plurality of complementary grooves 144, 146, 148 and 150 formed in the mating surfaces of spacers 132, 134, 136 and 138. An aperture 152 is provided in central support structure 120 to permit tension strap 76 to pass through. Aperture 152 is sized to permit central support structure 120 to translate and rotate with columns 50 and 52 without causing interference between tension strap 76 and aperture 152.

As shown in FIG. 3, base 84 of actuator tube 86 is supported in the flapping and lead lag directions by an inner support flange 160 which is attached by conventional fasteners to blade 10. Support flange 160 includes a thinned section 162, which permits base 84 to rotate freely about axis "C" in response to the differential elongation of columns 50 and 52.

The majority of the structural components, with the exception of the end caps and seats are constructed of titanium alloy in order to keep the weight of the assembly under about 2 lbs. The end caps are a steel alloy to allow high specific load and resistance to spalling.

Although certain preferred embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. An apparatus for providing helicopter rotor blade active control comprising:
   a helicopter rotor blade comprising an airfoil having a leading edge and a trailing edge, said airfoil having an interior volume;
   a flap disposed proximal said trailing edge;
   a hinge attaching said flap to said rotor blade, said flap being pivotable about said hinge to provide variations in lift generated by said rotor blade;
   an actuator mounted to said rotor blade and housed within said interior volume, said actuator comprising a smart material capable of changing shape in response to an external stimulus, said actuator comprises first and second column actuator members, each of said first and second column actuator members comprising a plurality of individual actuator elements disposed adjacent one another to form a columnar structure having proximal and distal ends and a longitudinal axis, said first and second column actuator members being disposed in a substantially parallel configuration,
   said actuator further comprises third and fourth column actuator members, each of said third and fourth column actuator members comprising a plurality of individual actuator elements disposed adjacent one another to form a columnar structure having proximal and distal ends and a longitudinal axis, said third column actuator member disposed coaxially with said first column actuator member, said fourth column actuator member disposed coaxially with said second column actuator member;
   a center support disposed between said first column actuator member and said third column actuator member, said first and third column actuator members compressively engaging said center support, said center support providing resistance to lateral movement of said first and third column actuator members;
   an actuator tube, said actuator tube having a base compressively engaging said first and second column actuator members, said actuator tube being adapted to rotate about an axis normal to said column actuator members in response to differential elongation of said first and second column actuator members, said actuator tube further including an output end; and
   a linkage disposed between said actuator and said flap, said linkage adapted to cause said flap to pivot about said hinge in response to movement of said actuator tube, and said output end of said actuator tube engaging said linkage for causing said flap to rotate in response to rotational movement of said actuator tube.

2. The apparatus of claim 1, wherein said smart material is chosen from the group consisting of piezoelectric, magnetostrictive and electrostrictive materials.

3. The apparatus of claim 1, wherein said smart material is piezoelectric ceramic.

4. The apparatus of claim 1, wherein:
   said center support is further disposed between said second column actuator member and said fourth column actuator member, said second and fourth column actuator members compressively engaging said center support, said center support providing resistance to lateral movement of said second and fourth column actuator members.

5. The apparatus of claim 1, wherein:
   said first and second column actuator members have semi-spherical end caps.

6. The apparatus of claim 5, wherein:
   said base of said actuator tube has two semi-spherical seats engaging the semi-spherical end caps of the first and second column actuator members.

7. The apparatus of claim 6, wherein:
   each of the two semi-spherical seats are comprised of a low friction bearing material.

8. The apparatus of claim 1, wherein:
   said first and second column actuator members are able to elongate differentially in response to an application of different voltage levels to the first and second column actuator members.

9. An actuator comprising:

a frame;

a first actuator column, said first actuator column comprising a first plurality of individual actuator elements disposed adjacent to one another to form a substantially columnar structure having a proximal end, a distal end, and a longitudinal axis, said first plurality of individual actuator elements each comprising a smart material capable of changing shape in response to an external stimulus;

a second actuator column, said second actuator column comprising a second plurality of individual actuator elements disposed adjacent to one another to form a substantially columnar structure having a proximal end, a distal end, and a longitudinal axis; said second plurality of individual actuator elements each comprising a smart material capable of changing shape in response to an external stimulus, said first and second actuator columns disposed in a longitudinal-axes-parallel, spaced-apart configuration with the distal ends of each of said first and second actuator columns engaging said frame;

an actuator tube comprising a base engaging said proximal ends of each of said first and second actuator columns and a free end extending away from said base; and a tension strap operatively disposed between said base and said frame for urging said base toward said frame thereby compressing said first and second actuator columns between said base and said frame.

10. The actuator of claim 9, wherein:

said smart material is chosen from the group consisting of piezoelectric, magnetostrictive electrostrictive, and shape memory alloy materials.

11. The apparatus of claim 9, wherein said smart material is piezoelectric ceramic.

12. The apparatus of claim 9, further comprising:

a first spherical joint disposed between said distal end of said first actuator column and said frame;

a second spherical joint disposed between said distal end of said second actuator column and said frame;

a third spherical joint disposed between said proximal end of said first actuator column and said base; and a fourth spherical joint disposed between said proximal end of said second actuator column and said base, said first, second, third, and fourth spherical joints each comprising complementary semi spherical surfaces adapted to transmit compressive loads without transmitting substantial bending loads.

13. The apparatus of claim 9, further comprising:

an intermediate support adapted to reduce bending stress of said first and second actuator columns, said intermediate support comprising a rigid bracket engaging said first and second actuator columns intermediate said proximal and distal ends thereof, said intermediate support supported by said frame to rotate about a first axis normal to said longitudinal axes of said actuator columns and fixed to preclude substantial translation normal to said longitudinal axes.

14. The apparatus of claim 13, wherein:

said first and second actuator columns each comprise a proximal portion and a distal portion, and wherein said intermediate support is disposed between and compressively engages said proximal portion and said distal portion of each of said first and second actuator columns to substantially preclude lateral movement thereof.

* * * * *